United States Patent [19]

Yamanaka et al.

[11] Patent Number: 4,792,539

[45] Date of Patent: Dec. 20, 1988

[54] PROCESS FOR PRODUCING CLAY DERIVATIVES HAVING A POROUS STRUCTURE AND NOVEL CLAY DERIVATIVES OBTAINED BY THE PROCESS

[75] Inventors: Shoji Yamanaka; Makoto Hattori, both of Hiroshima; Yuji Suzuki, Sakura, all of Japan

[73] Assignee: Kao Corporation, Tokyo, Japan

[21] Appl. No.: 870,411

[22] Filed: Jun. 4, 1986

[30] Foreign Application Priority Data

Jun. 20, 1985 [JP] Japan .................. 60-134726
Jun. 20, 1985 [JP] Japan .................. 60-134727

[51] Int. Cl.$^4$ ............................................. C04B 33/13
[52] U.S. Cl. ...................................... 501/144; 501/80; 501/149; 502/84; 423/610; 106/409
[58] Field of Search ............... 501/144, 149, 80; 502/80, 84; 106/291; 423/610

[56] References Cited

U.S. PATENT DOCUMENTS

| | | | |
|---|---|---|---|
| 4,248,739 | 2/1981 | Vaughan et al. | 502/63 |
| 4,499,195 | 2/1985 | Wheelock | 502/63 |
| 4,510,257 | 4/1985 | Lewis et al. | 502/80 |
| 4,629,713 | 12/1986 | Suzuki et al. | 502/84 |

FOREIGN PATENT DOCUMENTS

| | | | |
|---|---|---|---|
| 58-45158 | 3/1983 | Japan | 501/149 |
| 8503016 | 7/1985 | | |
| 8503015 | 7/1985 | | |

*Primary Examiner*—Steven Capella
*Attorney, Agent, or Firm*—Oblon, Fisher, Spivak, McClelland & Maier

[57] ABSTRACT

A novel process for producing clay derivatives having porous structure comprises hydrolyzing a metal alkoxide such as Al(OR)$_3$, Ti(OR)$_4$ and Si(OR)$_4$ in which each R represents a linear or branched hydrocarbon group having from 1 to 6 carbon atoms, deflocculating the resulting hydrolyzate with an acid to obtain a hydrous metal oxide sol, and reacting the sol with smectite.

The thus obtained porous clay derivatives have larger interlaminar interstices and a larger surface area than conventional ones. The interstices can be arbitrarily controlled by the acid amount. In addition, the derivatives are thermally stable so that they can be widely utilized in various fields as pigments, encapsulating agents, adsorbents, catalysts, carriers for catalysts and the like.

5 Claims, No Drawings

PROCESS FOR PRODUCING CLAY DERIVATIVES HAVING A POROUS STRUCTURE AND NOVEL CLAY DERIVATIVES OBTAINED BY THE PROCESS

BACKGROUND OF THE INVENTION (1) Field of the Invention

This invention relates to a process for producing clay derivatives having a porous structure and more particularly, to a process for producing stable composite materials which have large interlaminar spaces and are in the form of fine particles composed of clay minerals and hydrous metal oxides. The invention also relates to novel clay derivatives.

(2) Description of the Invention

Smectites, typical of which are montmorillonites, are a group of minerals constituting clay and have an interlaminar structure, in which exchangeable cations such as sodium, potassium, calcium, magnesium and the like are present in-between the laminar layers. Accordingly, it is known that various organic or inorganic ions or polar molecules are introduced into interlaminar interstices. It is usual that water molecules in the air are absorbed in the interstices of smectite. The space between the interstices is from approximately 3.0 to 5.8 angstrom and may be hereinafter referred to as "interlaminar interstices". However, the interlaminar interstices formed by the adsorption of moisture cannot be present stably because the moisture is readily desorbed on heating or under vacuum.

On the other hand, an attempt has been made to obtain a stable porous body by inserting bulky polynuclear metal ions into the interstices. More particularly, this is a process in which polynulcear ions or metal ions soluble in water are hydrolyzed with an alkali so that the resulting polynuclear hydroxide ions are introduced into interlaminar interstices of smectite, followed by thermal decomposition, thereby forming columns of the resultant oxide in the interstices. In the known process, polynuclear metal ions such as Al, Cr, Zr, Fe and the like are used to obtain a porous body having interlaminar interstices of 5 to 8 angstroms in width and a specific surface area of 200 to 400 $M^2$/g.

However, this porous body is disadvantageous in that when it is used as an encapsulating agent, adsorbent, catalyst, or carrier, it is required that an organic matter of a size depending on the purpose be adsorbed in a given amount, but the interstices of from 5 to 8 angstroms attained by the known process are not satisfactory. In addition, with the known porous body, it was difficult to control the size and adsorption of an organic matter to be adsorbed. The known process is also disadvantageous in that limitation is placed on the type of metal used. For instance, it was not possible to cause titanium oxide, which is versatilely used as a catalyst and particularly as a photo-catalyst in view of the electronic properties thereof or as a pigment because of the high refractive index, or copper or iron to be contained in the interstices. With regard to iron, there has been proposed a method in which a trinuclear iron acetate ion is used to obtain a porous body (Japanese Laid-open Patent Application No. 58-55332). This method is not generally applicable to other various metals.

SUMMARY OF THE INVENTION

Under these circumstances in the art, we made extensive studies on modification of smectites by reaction with hydrous metal oxides. As a result, it was found that when there is used a transparent or semitransparent sol which is obtained by hydrolyzing metal alkoxides and deflocculating the resulting hydrolyzate with an acid, porous clay derivatives having a number of advantages can be obtained. The porous clay derivatives have larger interlaminar interstices and a larger surface area than known counterparts and are thermally stable. In addition, a number of hydrous metal oxides including metal species which could not be used in the prior art processes can be incorporated into the interstices of the clay derivatives. Moreover, it was also found that the control in amount of the acid used for the flocculation enables one to control a size of the interlaminar interstices. The present invention is accomplished on the basis of the above findings.

More particularly, the present invention provides a process for producing clay derivatives having a porous structure which comprises hydrolyzing a metal alkoxide, deflocculating the resulting hydrolyzate with an acid to form a hydrous metal oxide sol, and reacting the sol with smectites to obtain the derivatives.

Of these clay derivatives, we have found that clay derivatives containing hydrous titanium oxide as the hydrous metal oxide are novel and useful. Accordingly, the present invention also provides clay derivatives having a porous structure which are characterized by comprising hydrous titanium oxide in the interlaminar interstices of smectites.

DETAILED DESCRIPTION OF THE INVENTION AND PREFERRED EMBODIMENTS

The clay minerals suitably used in the present invention include smectites such as montmorillonites which are capable of swelling with water. However, not only natural clay minerals, but also synthetic clay minerals may also be used. In addition, there may be also used a variety of artificial fluorine-containing laminar silicates which are swelling with water and have ion exchangeability. These natural and artificial clay minerals have a crystal structure composed of planar or two-dimensional silicate crystallites each of which has a thickness of about 9.6 angstroms and which are overlapped with each other. The crystallites are in the form of a plate, which reflects the formation of two-dimensional bonds. At the grain boundary where crystallite prarticles are put one on another, there are formed two-dimensional interstices similar to the interlaminar interstices in the inside of the crystals. It will be noted that the term "interlaminar interstices" is intended to mean not only interlaminar interstices of a silicate in the inside of the crystallite, but also interstices established at the grain boundary between the crystallites.

Examples of the metal alkoxide include $Al(OR)_3$, $Ti(OR)_4$, $Si(OR)_4$, $Fe(OR)_3$, and $Cu(OR)_2$ in which each R represents a linear or branched hydrocarbon group having from 1 to 6 carbon atoms.

The hydrolysis of the metal alkoxide is effected by adding the alkoxide to water at a temperature of 5° to 80° C. in a concentration of 0.0001 to mole. As a result, a white precipitate is formed. The acid used for the deflocculation of the precipitate may be either organic acids or inorganic acids, of which hydrochloric acid, sulfuric acid, nitric acid or the like is preferred. The amount of the acid should be not less than 1/5 times by mole the metal alkoxide. Preferably, the amount is in the range of ½ to 4 times by mole, by which a transparent or semi-transparent hydrous metal oxide sol can be obtained. Violent agitation is effective for the deflocculation reaction. For the formation of the hydrous metal oxide sol, the deflocculation may be effected by adding a predetermined amount of an acid after hydrolysis of a metal alkoxide, or by adding a metal alkoxide to an aqueous solution containing, from the first, a predetermined amount of an acid in which the hydrolysis and the deflocculation reaction proceed simultaneously. The resultant transparent or semi-transparent sol contains fine particles of a hydrous metal oxide having a size of 10 to 1000 angstroms. The hydrous metal oxide has a composition of $M_nO_m \cdot XH_2O$ in which M represents a metal, n and m are, respectively, an integer corresponding to the valence of the metal, and X is an integer including zero.

The hydrous metal oxide sol is subsequently added to an aqueous suspension of a smectite under agitation, followed by collecting the resulting product by filtration or centrifugal separation and drying to obtain porous clay derivatives. Treatment at a higher temperature of the product thus obtained will give porous clay derivatives having anhydrous metal oxides in the interlaminar interstices.

The concentration of the smectite suspension is in the range of 0.001 to 5 wt % (hereinafter referred to simply as %), preferably 0.1 to 1%. The amount of the hydrous metal oxide sol is 5 to 100 times, preferably 10 to 40 times, the cation exchange capacity of the smectite used. The reaction temperature should preferably be from room temperature to 50° C.

According to the process of the invention, the interlaminar interstices of clay derivatives can be controlled in dimension by controlling an amount of the acid used for the preparation of the hydrous metal oxide sol. More specifically, as the amount increases, the interlaminar interstices of the derivative become larger. When the acid is used in an amount of ½ to 4 times by mole a metal alkoxide, the interstices reach a maximum of 10 to 16 angstrom with a surface area of 300 to 450 m²/ g. However, larger amounts are unfavorable because the smectite structure starts to be broken.

Of the thus obtained clay derivatives, those derivatives in which hydrous titanium oxide is included in the interstices of smectites and which have a porous structure are novel ones having the following properties. When an acid is used in an amount 1 to 4 times by mole titanium, the resulting derivatives have interlaminar interstices not smaller than 10 angstroms and a surface area not smaller than 315 m²/ g.

As will be appreciated from the foregoing, the clay derivatives having a porous structure and obtained according to the process of the invention have large interlaminar interstices which can be arbitrarily controlled in width. As a consequence, it is possible that an adsorbate of an intended size is adsorbed in the interstices in an intended amount. The derivatives are so stable that they can be widely utilized in various fields as pigments, encapsulating agents, adsorbents, catalysts, carriers for catalysts and the like. Particularly, the novel clay derivatives containing hydrous titanium oxide are useful as a pigment due to the high refractive index of titanium oxide.

The present invention is more particularly described by way of examples.

EXAMPLE 1

22.8 g of titanium tetraethoxide ($Ti(OC_2H_5)_4$) was added to 300 ml of water for hydrolysis and agitated violently to sufficiently disperse the resulting white precipitate. Subsequently, 100 ml of 1N hydrochloride acid was added and agitated for 1 hour to obtain a transparent sol. The sol was dropped into a suspension of 2.5 g of montmorillonite from Yamagata, Japan (commercial name "Kunipia G4", cation exchange capacity: 100 milli-equivalent/100 g) in 600 ml of water in 10 minutes while agitating, followed by agitation for further 1 hour at 50° C. The resultant product was filtered, washed, dried and milled. The powder was white in color and had a content of $TiO_2$ of 36%.

EXAMPLES 2–6

24.8 g of titanium tetraisopropoxide ($Ti(O-iso-C_3H_7)_4$) was added to 400 ml of each of 0.125N, 0.25N, 0.5N, 1.0N and 2.0N hydrochloric acid and violently agitated to obtain semi-transparent or transparent sols. Each sol was reacted with montmorillonite in the same manner as in Example 1 and the resulting product was centrifugally separated, washed and dried to obtain a white powder.

EXAMPLE 7

The general procedure of Example 1 was repeated except that 34.0 g of titanium tetrabutoxide was used instead of 22.8 g of titanium tetraethoxide and 100 ml of 1N sulfuric acid was used instead of 1N hydrochloric acid, thereby obtaining a white powder.

The clay derivatives obtained in Examples 1 to 7 were each subjected to an X-ray powder diffraction method to determine the interlaminar interstices and also to a nitrogen gas adsorption method using the powder treated at 300° C. to determine the surface area. The results are shown in Table 1.

TABLE 1

| Ex. | R in Alkoxide | Acid | Amount of Acid | Transparency of Sol | Interlaminar Interstices | Surface Area |
|---|---|---|---|---|---|---|
| 1 | ethyl | nitric acid | 1 time by mole | transparent | 10.2 Å | 332 m²/g |
| 2 | isopropyl | hydrochloric acid | ½ time by mole | semi-transparent | 6.0 | 303 |
| 3 | " | hydrochloric acid | 1 time by mole | transparent | 10.2 | 390 |
| 4 | " | hydrochloric acid | 2 time by mole | transparent | 11.2 | 327 |
| 5 | " | hydrochloric acid | 4 time by mole | transparent | 15.4 | 350 |
| 6 | " | hydrochloric acid | 8 time by mole | transparent | 15.4 | 330 |
| 7 | butyl | sulfuric acid | 2 time by mole | transparent | 11.2 | 315 |

As will be seen from Table 1, all the derivatives were porous materials having large interlaminar interstices.

EXAMPLE 8–11

Thirty grams of each of aluminum triisopropoxide, ethyl silicate and iron triethoxide was added to 400 ml of water and agitated to hydrolyze the alkoxide. An acid was added to each hyrolyzate under conditions indicated in Table 2, followed by agitation for 1 to 2 hours to obtain a semi-transparent or transparent sol. Thereafter, the procedure of Example 1 was repeated to obtain white (Examples 8-10) and reddish brown (Example 11) powders. The results are shown in Table 2 below.

TABLE 2

| Ex. | Metal Species | R in Alkoxide | Acid | Amount of Acid | Interlaminar Interstices | Surface Area |
|---|---|---|---|---|---|---|
| 8 | $Al^{3+}$ | isopropyl | hydrochloric acid | ½ time by mole | 10.4 Å | 440 $m^2/g$ |
| 9 | " | butyl | nitric acid | 1/5 time by mole | 6.6 | 360 |
| 10 | $Si^{4+}$ | ethyl | hydrochloric acid | ½ time by mole | 5.0 | 335 |
| 11 | $Fe^{3+}$ | ethyl | hydrochloric acid | 1 time by mole | 4.6 | 310 |

TEST EXAMPLE 1

The samples obtained in Examples 2 to 5 were subjected to measurement of the mode of adsorption and the pore capacity by adsorbing cyclohexane molecules or methanol molecules in the form of a gas. The adsorptions of cyclohexane and methanol were, respectively, determined by a procedure in which a sample was dried in a glass container under vacuum at 25° C. over day and night, to which cyclohexane or methanol vapor was gradually added, and the adsorption was determined from a change in weight of the sample. The results are shown in Table 3.

TABLE 3

| Sample | Adsorbed Molecule | Mode of Adsorption | Pore Capacity |
|---|---|---|---|
| Example 2 | methanol | adsorption of monomolecular layer in the interstice | 0.12 ml/g |
|  | cyclohexane | adsorption of monomolecular layer in the interstice |  |
| Example 3 | methanol | adsorption of polymolecular layer in the interstice | 0.16 |
|  | cyclohexane | adsorption of monomolecular layer in the interstice |  |
| Example 4 | methanol | adsorption of polymolecular layer in the interstice | 0.20 |
|  | cyclohexane | adsorption of monomolecular layer in the interstice |  |
| Example 5 | methanol | adsorption of polymolecular layer in the interstice | 0.22 |
|  | cyclohexane | adsorption of polymolecular layer in the interstice |  |

As will be seen from Table 3, the porous clay derivatives of the invention have large pores sufficient to permit the adsorption of the polymolecular layer of methanol molecules and the adsorption of the mono to polymolecular layer of cyclohexane molecules.

TEST EXAMPLE 2

In order to determine the thermal stability of the sample obtained in Example 5, the sample was treated in air at a temperature of 200° to 500° C. for 4 hours and cooled down to room temperature, followed by measurement of the interlaminar interstice and the surface area. The results are as shown in Table 4 below.

TABLE 4

| Sample | Treating Temperature | Interlaminar Interstice | Surface Area |
|---|---|---|---|
| Example 5 | 200° C. | 15.0 angstroms | 420 $m^2/g$ |
|  | 300° C. | 15.0 | 350 |
|  | 400° C. | 14.8 | 330 |
|  | 500° C. | 14.6 | 315 |

As will be apparent from Table 4, the porous clay derivatives of the invention have good thermal stability and involve little shrinkage of the interstices up to 500° C., with only a slight lowering of the surface area.

What is claimed is:

1. A process for producing a clay derivative having a porous structure comprising:
   hydrolyzing a metal alkoxide,
   deflocculating the resulting hydrolyzate with an inorganic acid selected from the group consisting of hydrochloric acid, sulfuric acid and nitric acid to obtain a hydrous metal oxide sol containing fine particles of the hydrous metal oxide having a size of from 10 to 1,000 angstroms, and
   reacting the resulting hydrous metal oxide sol with an aqueous suspension of smectite under agitation.

2. A process according to claim 1, wherein said metal alkoxide is a member selected from the group consisting of $Al(OR)_3$, $Ti(OR)_4$, $Si(OR)_4$, $Fe(OR)_3$ and $Cu(OR)_2$ in which R represents a linear or branched hydrocarbon group having from 1 to 6 carbon atoms.

3. A process according to claim 1, wherein the amount of acid used for the deflocculation is 1/5 to 4 times by mole of said metal alkoxide.

4. A process according to claim 1, wherein interlaminar interstices of said porous structure are controlled by controlling the amount of acid used for deflocculating said hydrolyzate within a range of between 1/5 and 4 times by mole of said metal alkoxide.

5. A process according to claims 1 to 4, wherein said metal alkoxide is a titanium alkoxide of the formula $Ti(OR)_4$, in which R represents linear or branched hydrocarbon group having from 1 to 6 carbon atoms.

* * * * *